(12) United States Patent
Kamimura et al.

(10) Patent No.: US 8,911,576 B2
(45) Date of Patent: Dec. 16, 2014

(54) METHOD FOR PRODUCING FLUORORESIN-COATED ROLLER OR BELT

(75) Inventors: Hiromi Kamimura, Sennan-gun (JP); Masahiro Habuka, Sennan-gun (JP); Shingo Harada, Sennan-gun (JP); Yasuhiro Fukumoto, Sennan-gun (JP)

(73) Assignee: Sumitomo Electric Fine Polymer, Inc., Sennan-gun, Osaka (JP)

( * ) Notice: Subject to any disclaimer, the term of this patent is extended or adjusted under 35 U.S.C. 154(b) by 66 days.

(21) Appl. No.: 13/509,381

(22) PCT Filed: Nov. 9, 2010

(86) PCT No.: PCT/JP2010/069905
§ 371 (c)(1),
(2), (4) Date: May 17, 2012

(87) PCT Pub. No.: WO2011/058961
PCT Pub. Date: May 19, 2011

(65) Prior Publication Data
US 2012/0222796 A1 Sep. 6, 2012

(30) Foreign Application Priority Data

Nov. 12, 2009 (JP) ................................. 2009-259233
Apr. 21, 2010 (JP) ................................. 2010-097974

(51) Int. Cl.
*B32B 37/06* (2006.01)
*B29C 65/00* (2006.01)
*B29C 61/02* (2006.01)
(Continued)

(52) U.S. Cl.
CPC .......... *G03G 15/2057* (2013.01); *B29C 66/919* (2013.01); *B29C 66/949* (2013.01); *B29C 66/0344* (2013.01); *B29C 61/02* (2013.01); *B29K 2027/12* (2013.01); *B29C 65/18*
(Continued)

(58) Field of Classification Search
CPC .......... B29C 61/02; B29C 63/42; B29C 65/02
USPC ................ 156/84, 85, 86, 160, 165, 293, 294
See application file for complete search history.

(56) References Cited

U.S. PATENT DOCUMENTS 3,749,621 A 7/1973 Shoffner
5,968,623 A * 10/1999 Takeuchi et al. ........... 428/36.91
(Continued)

FOREIGN PATENT DOCUMENTS

CN 1128700 A 8/1996
JP 64-1534 1/1989
(Continued)

*Primary Examiner* — Philip Tucker
*Assistant Examiner* — John Blades
(74) *Attorney, Agent, or Firm* — Drinker Biddle & Reath LLP

(57) ABSTRACT

A fluororesin coating layer fusion-bonded directly to a base member or to a rubber layer on a base member can be formed by conducting heating for a significantly short time. A fluororesin-coated roller or belt that has a fluororesin coating layer with few defects and a rubber layer underneath whose thermal deterioration is suppressed is provided. The production method therefor include a step of inserting a base member or a rubber-coated base member including a base member and at least a rubber layer on the outer peripheral surface of the base member into an empty space of a thermally shrinkable fluororesin tube; a preliminary shrinking step conducted according to need; a pressure fusion-bonding step of bringing the base member or rubber-coated base member into contact with a hot plate surface heated to a temperature in a range of 250° C. to 400° C. under pressure while rotating the base member or rubber-coated base member so as to fusion-bond the thermally shrinkable fluororesin tube onto the outer peripheral surface of the base member or the rubber-coated base member; and a reheating step and a rapid cooling step that are conducted according to need.

6 Claims, 2 Drawing Sheets

(51) Int. Cl.
*B29C 65/18* (2006.01)
*B29C 63/42* (2006.01)
*B29C 65/66* (2006.01)
*G03G 15/20* (2006.01)
*B29K 27/12* (2006.01)
*B29C 63/00* (2006.01)
*B29L 31/32* (2006.01)
*B29C 65/02* (2006.01)

(52) U.S. Cl.
CPC ... (2013.01); *B29C 66/91431* (2013.01); *B29C 66/71* (2013.01); *B29C 66/0342* (2013.01); *B29C 66/91645* (2013.01); *B29C 63/0047* (2013.01); *B29C 66/742* (2013.01); *B29L 2031/324* (2013.01); *B29C 63/42* (2013.01); *B29C 66/91421* (2013.01); *B29C 66/8362* (2013.01); *B29C 65/66* (2013.01); *B29C 66/73715* (2013.01); *B29C 66/91445* (2013.01); *B29C 66/91411* (2013.01); *B29C 65/02* (2013.01); *B29C 66/52272* (2013.01); *B29C 66/929* (2013.01)
USPC .............. 156/86; 156/84; 156/85; 156/293; 156/294

(56) References Cited

U.S. PATENT DOCUMENTS 6,117,257 A * 9/2000 Takahashi et al. ............ 156/86
6,602,368 B2 * 8/2003 Geiger ........................... 156/86

FOREIGN PATENT DOCUMENTS

| JP | 3112335 | 8/1993 | | |
|----|---------|--------|---|---|
| JP | 7-199691 | 8/1995 | | |
| JP | 7-281549 | 10/1995 | | |
| JP | 10-180874 | * 7/1998 | ............ | B29C 53/42 |
| JP | 10-198201 | 7/1998 | | |
| JP | 3584682 | 12/1998 | | |
| JP | 11-336742 | 12/1999 | | |
| JP | 2001-295830 | 10/2001 | | |
| JP | 2003-131460 | 5/2003 | | |
| JP | 2003-323071 A | 11/2003 | | |
| JP | 2004-276290 | 10/2004 | | |
| JP | 2004-344374 | 12/2004 | | |
| JP | 2008-257098 | 10/2008 | | |
| WO | 2008/126915 | 10/2008 | | |

* cited by examiner

METHOD FOR PRODUCING FLUORORESIN-COATED ROLLER OR BELT

TECHNICAL FIELD

The present invention relates to methods for producing fluororesin-coated rollers or belts. In particular, the present invention relates to a method for producing a fluororesin-coated roller or belt which has a layered structure obtained by forming a fluororesin layer either directly on an outer peripheral surface of a columnar, cylindrical, tubular, or endless-belt-shaped base member or on a rubber layer on the base member.

BACKGROUND ART

In general, image-forming apparatuses such as electrophotographic (including electrostatic recording) copiers, facsimile machines, and laser beam printers form an image by carrying out a series of steps including a charging step of evenly and uniformly charging a surface of a photoconductor; a step of exposing an image to form an electrostatic latent image on the photoconductor; a developing step of causing a toner (developer) to adhere to the electrostatic latent image to form a toner image; a transfer step of transferring the toner image on the photoconductor onto a recording medium such as paper or an overhead projector (OHP) sheet; and a fixing step of fixing the unfixed toner image to the recording medium.

In general, in the fixing step, the unfixed toner image on the recording medium is heated and pressurized to fix the toner image to the recording medium. In the fixing step, a fixing unit (also referred to as "fixing device") equipped with a roller pair including a fixing roller having built-in heating means such as an electric heater and a pressure roller arranged to oppose the fixing roller is usually used. A recording medium on which an unfixed toner image has been formed is passed through a nip portion formed by bringing the two rollers into contact with each other so as to heat the recording medium under pressure and fix the unfixed toner image to the recording medium. In the fixing unit, the fixing roller and the pressure roller constituting the roller pair are each rotatably supported and rotated synchronously.

In recent years, a fixing technique has been developed in which an unfixed toner image on a recording medium is heated under pressure by substantially directly using a heater installed in a thin-walled tubular or endless-belt-shaped fixing belt arranged to oppose a pressure roller or belt. This fixing technique can significantly shorten the standby time after power is turned on and contributes to weight- and size-reduction of image-forming apparatuses.

Image-forming apparatuses use various types of rollers and belt members, such as charging rollers, charging belts, transfer rollers, and transfer belts, in steps other than the fixing step. Various types of rollers and belt members used in an image-forming apparatus are required to have functions that are suitable for the respective usages (e.g., a charging roller to have chargeability).

Among these functions, one of the common functions or characteristics is the requirement of high toner releasability that prevents a toner from adhering to surfaces and avoids occurrence of toner filming. In particular, a fixing roller or belt comes into close contact with an unfixed toner image on a recording medium under pressure and heating and thus is particularly required to have high toner releasability at its surface. When residual toner remains or toner filming occurs on a surface of a fixing roller or belt, a high-quality image cannot be formed.

In addition, these rollers or belt members are sometimes required to have an adequate degree of elasticity at their surfaces. For example, a fixing roller or belt is often required to have an ability to heat and pressurize an unfixed toner image on a recording medium while deforming around the unfixed toner image. A pressure roller or belt arranged to oppose the fixing roller or belt is also required to have an elastic surface.

Various rollers and belt members of image-forming apparatuses generally include as a main constituent component a columnar, cylindrical, tubular, or endless-belt-shaped base member. In order to impart toner releasability to a surface of the roller or belt member, a fluororesin layer is typically formed as the outermost layer of the base member. In order to impart elasticity to a surface of the roller or belt member, a rubber layer is typically formed on a base member by using a heat-resistant rubber material such as fluororubber and/or silicone rubber.

Thus, a fluororesin-coated roller or belt that includes a fluororesin layer directly on a base member or on a rubber layer disposed on the base member is used as the roller or belt member. A fluororesin layer generally has high non-tackiness, wear resistance, and heat resistance. However, in order to form a fluororesin layer directly on the base member or on a rubber layer on the base member, firing at a high temperature are needed or long hours of heating at a high temperature is needed to fusion-bond the fluororesin layer. Thus, not only has it been difficult to further improve the productivity of producing fluororesin-coated rollers or belts, but there has also been a problem in that the rubber layer underneath becomes thermally deteriorated during formation of the fluororesin layer, thereby decreasing its durability. Various production methods related to fluororesin-coated rollers or belts have been proposed but it has been difficult to sufficiently address the challenges described above.

A method for producing a fluororesin-coated roller or belt is known with which a coating film of a fluororesin coating material is formed on a base member or a rubber layer on a base member and fired at high temperature. A homogeneous fluororesin layer having a smooth flat surface can be formed by firing the fluororesin coating film.

For example, U.S. Pat. No. 3,584,682 (PTL 1) discloses a fixing member that includes a carrier, an adhesive layer disposed on the carrier, the adhesive layer containing a fluororesin and a silicone-modified polyimide, and an outermost layer composed of a fluororesin. Examples disclosed in PTL 1 include an experimental example in which a fluororesin layer is formed by electrostatically coating an adhesive layer with a powder coating material of a tetrafluoroethylene-perfluoroalkyl vinyl ether copolymer (PFA) and a curing treatment and film-forming treatment are performed under firing conditions of 375° C. and 30 minutes.

Japanese Unexamined Patent Application Publication No. 10-198201 (PTL 2) discloses a fixing belt that has a layered structure including a thin-walled tubular base member, a heat resistant elastomer layer on the outer peripheral surface of the base member, and a fluororesin layer on the heat resistant elastomer layer. Examples of PTL 2 include an experimental example in which a silicone rubber layer is formed on an outer peripheral surface of a polyimide tube by press forming and a fluororesin coating material is applied to the silicone rubber layer and sintered to form a fluororesin layer.

According to the firing methods disclosed in PTL 1 and PTL 2, firing must be conducted for a long time in a dry heat atmosphere at high temperature equal to or higher than the melting point of the fluororesin in order to form a fluororesin layer. In the case where a rubber layer is present beneath the fluororesin layer, thermal deterioration of the rubber layer will occur during firing of the fluororesin layer since the heat resistant temperature of the rubber layer is lower than the firing temperature of the fluororesin layer. In particular, thermal deterioration of the rubber layer surface easily occurs at the interface between the fluororesin layer and the rubber layer. As a result, the interlayer adhesiveness may be degraded and interlayer separation may occur. The durability of the fluororesin-coated roller or belt is decreased as a result.

Another known method for producing a fluororesin-coated roller or belt is a method including forming a fluororesin layer on an inner surface of a cylindrical die, inserting a roller-shaped base member at the axial center of the cylindrical die, injecting a rubber material into a gap between the fluororesin layer and the roller-shaped base member, and vulcanizing the rubber material. After vulcanization, a fluororesin-coated roller having a "fluororesin layer/rubber layer/base member" layered structure is removed from the cylindrical die.

For example, Japanese Unexamined Patent Application Publication No. 11-336742 (PTL 3) and Japanese Unexamined Patent Application Publication No. 2001-295830 (PTL 4) each disclose a method for producing a fluororesin-coated roller or belt, the method including step 1 of applying a fluororesin coating material or a fluororesin powder coating material onto an inner surface of a cylindrical die to form a coating film and firing the coating film to form a fluororesin film; step 2 of inserting a roller-shaped base member at the axial center of the cylindrical die; step 3 of injecting a rubber material into a gap between the fluororesin coating film and the roller-shaped base member and vulcanizing the rubber material; and step 4 of removing the cylindrical die.

According to the casting method disclosed in PTL 3 and PTL 4, firing of the fluororesin layer that forms the outermost layer is performed in the first step and vulcanization of the rubber layer is performed thereafter. Thus, thermal deterioration of the rubber layer caused by firing of the fluororesin layer can be prevented. However, according to the casting method disclosed in PTL 3 and PTL 4, a high-precision cylindrical die is needed and it is difficult to accurately align the axial center of the roller-shaped base member with the axial center of the cylindrical die. Moreover, according to the casting method, problems such as it being difficult to form a thin rubber layer, the thickness of the rubber layer becoming uneven, and there being a possibility of the fluororesin film breaking during removal of the die are likely to occur.

Another known method for producing a fluororesin-coated roller or belt is a method including a step of inserting a rubber-coated roller base member into a fluororesin tube having no thermal shrinkability while radially expanding an opening portion of the fluororesin tube.

For example, Japanese Unexamined Patent Application Publication No. 2004-276290 (PTL 5) and Japanese Unexamined Patent Application Publication No. 2008-257098 (PTL 6) each disclose a method for producing a fluororesin-coated roller or belt, the method including applying a low-viscosity adhesive onto an outer peripheral surface of a rubber-coated roller base member and covering the rubber-coated roller base member with a fluororesin tube having an inner diameter smaller than the outer diameter of the rubber-coated roller base member while radially expanding one end of the fluororesin tube. After the covering step, there is a heat-curing step for the adhesive layer.

The fluororesin tube covering method disclosed in PTL 5 and PTL 6 has the following problems: a complex, expensive machine is needed to expand the inner diameter of the fluororesin tube; a low-viscosity adhesive must be applied onto a rubber layer surface of the rubber-coated roller base member so as to impart lubricity that allows the base member to be covered with the fluororesin tube; the thickness of the adhesive layer tends to vary; bubbles are easily generated between the fluororesin tube and the layer underneath due to entrapment of air; heating at high temperature must be conducted for a long time to cure the adhesive; and durability may be insufficient due to failure to fusion-bond the fluororesin tube to the rubber layer.

Yet another known method for producing a fluororesin-coated roller or belt is a method including steps of covering a base member or a rubber layer on the base member with a thermally shrinkable fluororesin tube, performing heating to conduct thermal shrinkage, and further conducting heating at high temperature for a long time to carry out fusion bonding.

For example, Japanese Unexamined Patent Application Publication No. 64-1534 (PTL 7) discloses a method for producing a fluororesin-coated columnar article, the method including covering a primer-treated columnar article with a thermally shrinkable PFA tube, shrinking and fixing the tube in place by heating at a temperature in a range of 80° C. to 250° C., and firing the tube at a temperature in a range of 330° C. to 400° C. to conduct fusion bonding.

U.S. Pat. No. 3,112,335 (PTL 8) discloses a method for producing a tubular composite film, the method including covering an outer peripheral surface of a polyimide tube with a thermally shrinkable PFA tube and conducting firing by heating at a temperature of 280° C. to 400° C. for 30 to 60 minutes (in Example 1, for 40 minutes at 350° C.) to fusion-bond the thermally shrinkable PFA tube.

International publication No. 2008/126915 (PTL 9) discloses a method for producing a fixing roller or belt, the method including forming an elastic layer on a base member such as a stainless steel cylinder, covering the elastic layer with a thermally shrinkable PFA tube, thermally shrinking the tube in a 290° C. to 300° C. atmosphere to bring the tube into close contact with the elastic layer, and conducting heating at a temperature equal to or higher than the melting point of PFA to achieve fusion bonding.

The methods of covering a base member with a thermally shrinkable fluororesin tubes disclosed in PTL 7 to PTL 9 have the following problems: bubbles are easily generated between the base member and the thermally shrinkable fluororesin tube or between the rubber layer and the thermally shrinkable fluororesin tube; slack and wrinkles are easily generated in the thermally shrinkable fluororesin tube during thermal shrinking; a heating treatment in a dry heat atmosphere must be conducted for a long time to fusion-bond the thermally shrinkable fluororesin tube; and a rubber layer underneath is susceptible to thermal deterioration during fusion-bonding of the thermally shrinkable fluororesin tube.

Some of PTL 7 to PTL 9 state that the thermally shrinkable fluororesin tube can be fusion-bonded onto the outer peripheral surface of a base member or a rubber layer by conducting heating for a relatively short time. However, in practice, in order to fusion-bond a thermally shrinkable fluororesin tube, heating must be performed for a long time in a dry heat atmosphere at high temperature. If the heating temperature is excessively low or the heating time is excessively short, fusion-bonding of the thermally shrinkable fluororesin tube onto the outer peripheral surface of the base member or the rubber layer becomes insufficient and the durability of the fluororesin-coated roller or belt is impaired.

CITATION LIST

Patent Literature

PTL 1: Japanese Patent No. 3584682
PTL 2: Japanese Unexamined Patent Application Publication No. 10-198201
PTL 3: Japanese Unexamined Patent Application Publication No. 11-336742
PTL 4: Japanese Unexamined Patent Application Publication No. 2001-295830
PTL 5: Japanese Unexamined Patent Application Publication No. 2004-276290
PTL 6: Japanese Unexamined Patent Application Publication No. 2008-257098
PTL 7: Japanese Unexamined Patent Application Publication No. 64-1534
PTL 8: Japanese Patent No. 3112335
PTL 9: International Publication No. 2008/126915

SUMMARY OF INVENTION

Technical Problem

An object of the present invention is to provide a method for producing a fluororesin-coated roller or belt that uses a thermally shrinkable fluororesin tube covering method, with which a fluororesin coating layer fusion-bonded directly on a base member or on a rubber layer on the base member can be formed by heating for a relatively short time and with which generation of bubbles between the thermally shrinkable fluororesin tube and the base member or rubber layer and slack and wrinkles of the thermally shrinkable fluororesin tube are prevented.

Another object of the present invention is to provide a method for producing a fluororesin-coated roller or belt with which the high-temperature heating time required to fusion-bond the thermally shrinkable fluororesin tube is significantly shortened and the thermal deterioration of the rubber layer is notably suppressed even when a rubber-coated base member including a rubber layer on the outer peripheral surface of a base member is used.

The inventors of the present invention have conducted extensive studies to resolve the problems described above and have conceived of a method for fusion-bonding a thermally shrinkable fluororesin tube onto an outer peripheral surface of a base member or a rubber-coated base member by bringing the base member or rubber-coated base member having the thermally shrinkable fluororesin tube disposed on the outer peripheral surface thereof into contact with a hot plate surface heated to a particular temperature under pressure while rotating the base member or rubber-coated base member.

According to the method of the present invention, for example, even when bubbles are generated between the thermally shrinkable fluororesin tube and the base member or rubber layer and slack and wrinkles are generated in the thermally shrinkable fluororesin tube during preliminary shrinking of heating the thermally shrinkable fluororesin tube, such bubbles, slack, wrinkles, and the like can be eliminated by conducting the step of bringing the thermally shrinkable fluororesin tube into contact with the hot plate surface under pressure while rotating the base member or rubber-coated base member. According to the method of the present invention, a fluororesin-coated roller or belt having high durability and high surface smoothness and flatness can be produced.

When a method of bringing a base member or rubber-coated base member having a thermally shrinkable fluororesin tube disposed on an outer peripheral surface thereof into contact with a hot plate surface heated to a particular temperature under pressure while rotating the base member or rubber-coated base member is employed, the thermally shrinkable fluororesin tube can be fusion-bonded to the outer peripheral surface of the base member or rubber-coated base member in a short time due to excellent heat conductivity from the hot plate surface. As a result, the thermal deterioration of the rubber layer underneath can be significantly suppressed. The present invention has been made based on these findings.

Solution to Problem

The present invention provides a method for producing a fluororesin-coated roller or belt that includes a base member having an outer peripheral surface having a circular cross-section taken in perpendicular to a central axis extending in a longitudinal direction and a fluororesin layer disposed directly on the base member or on a rubber layer on the base member, the method including:

(1) a step of inserting the base member or a rubber-coated base member prepared by forming at least a rubber layer on an outer peripheral surface of the base member into an empty space of a thermally shrinkable fluororesin tube having an inner diameter larger than an outer diameter of the base member or the rubber-coated base member; and (2) a pressure fusion-bonding step of bringing the base member or rubber-coated base member into contact with a hot plate surface heated to a temperature in a range of 250° C. to 400° C. under pressure while rotating the base member or rubber-coated base member so as to fusion-bond the thermally shrinkable fluororesin tube onto the outer peripheral surface of the base member or the rubber-coated base member.

Further, the method preferably includes a reheating step after the pressure fusion-bonding step, the reheating step including heating the fluororesin layer to a temperature equal to or higher than a melting point of a fluororesin constituting the fluororesin layer.

Advantageous Effects of Invention

According to the present invention, a fluororesin-coated layer fusion-bonded directly to a base member or to a rubber layer on the base member can be formed by heating for a relatively short time. According to the production method of the present invention, bubbles are not generated between the thermally shrinkable fluororesin tube and the base member or a rubber layer of the rubber-coated base member and slack and wrinkles do not occur in the thermally shrinkable fluororesin tube. According to the production method of the present invention, even when a rubber-coated base member in which a rubber layer is formed on an outer peripheral surface of a base member is used, thermal deterioration of the rubber layer can be significantly suppressed. The production method of the present invention does not require a complicated, inexpensive facility and the operation of each step is relatively easy.

DESCRIPTION OF EMBODIMENTS

Figure 1:
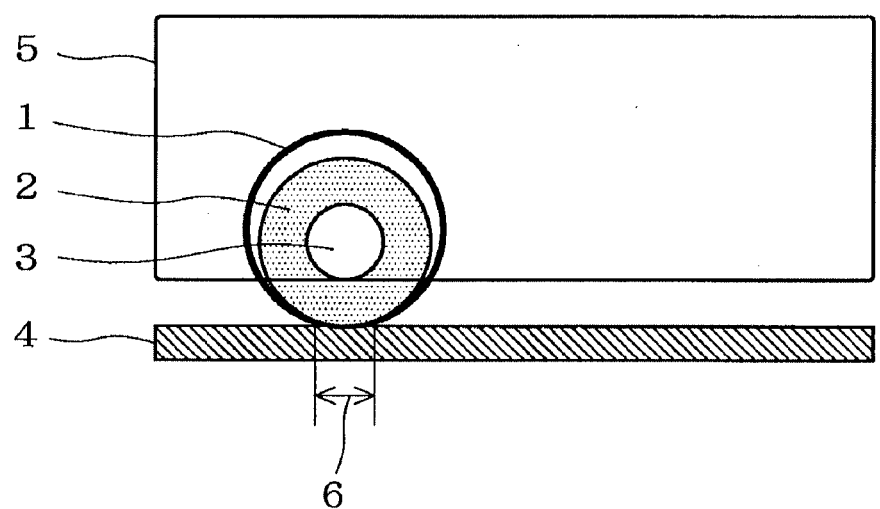
FIG. 1 is a schematic cross-sectional view illustrating an example of a production step in which a base member or rubber-coated base member having a thermally shrinkable fluororesin tube in close contact with the outer peripheral surface thereof is brought into contact with a hot plate surface under pressure while rotating the base member or rubber-coated base member.

The present invention relates to a method for forming a fluororesin-coated roller or belt including a fluororesin layer disposed directly on a base member with an outer peripheral surface having a circular cross-section taken in perpendicular to a center axis extending in the longitudinal direction of the base member or on a rubber layer on such a base member.

The base member used in the present invention has an outer peripheral surface having a circular cross-section taken in perpendicular to the center axis extending in the longitudinal direction of the base member. Examples of the base member having such a structure include columnar, cylindrical, tubular, and endless-belt-shaped base members. Columnar base members are, in general, shaped articles that are entirely solid and are suitable for use as base members of roller parts, such as pressure rollers, that do not need to have heaters installed therein.

In general, cylindrical base members refer to shaped articles having a particular thickness. A cylindrical base member coated with a fluororesin is called a fluororesin-coated roller. In general, tubular base members are tubular shaped articles formed of metal thin films or synthetic resin films. However, since the cylindrical base members and the tubular base members are common in that they are both hollow, the boundary therebetween is not necessarily clear. Endless-belt-shaped base members often refer to those articles having a large diameter at a cross-section but the boundary between the endless-belt-shaped base members and the tubular members is not necessarily clear. Accordingly, in this technical field, for example, a fluororesin-coated tubular base member may be referred to as a fluororesin-coated belt, a fluororesin-coated roller, or a fluororesin-coated tube.

The base member is preferably a shaped article composed of a material that can withstand a heating treatment at 300° C. to 400° C. for 60 minutes or longer. A columnar or cylindrical base member is typically a columnar or cylindrical shaped article composed of a metal such as aluminum, an aluminum alloy, iron, or stainless steel, having high heat conductivity or a ceramic such as alumina or silicon carbide. The columnar or cylindrical base member may have a shape of a shaft having bearing portions at two ends, respectively. When the columnar or cylindrical base member is composed of a metal, it is generally called a core metal.

Tubular base members are shaped articles called metal tubes composed of metal thin films or heat-resistant resin tubes composed of synthetic resin films and may also be referred to as endless belts. Examples of the material for the metal tubes include iron, nickel, and alloys thereof. When an electromagnetic induction heating technique is employed for heating the fixing belt, the material for the metal tubes is preferably iron, nickel, an alloy thereof, or a ferrite-based stainless steel. When there is need to efficiently heat the entire belt member, the metal tube is preferably a nickel belt or stainless steel belt that has a small heat capacity and can be heated faster by electromagnetic induction heating.

Materials that have high heat resistance and a low heat capacity and can be rapidly heated by a heater during use are preferred as the material for the synthetic resin tubes. Typically, heat-resistant resin having a heat resisting temperature, such as a melting point, a thermal deformation temperature, and a thermal decomposition temperature, of 250° C. or higher are used. Specific examples of the heat-resistant resin include polyimide, polyamideimide, polyether ether ketone, polyphenylene sulfide, and polybenzimidazol. Among these, polyimide, polyamideimide, and polybenzimidazol are preferred, polyimide is more preferred, and thermosetting polyimide is particularly preferred from the viewpoints of heat resistance and durability.

Endless-belt-shaped base members refer to tubular shaped articles having a small diameter and endless belts (seamless belts) having a large diameter depending on the diameter of a cross-section. Fluororesin-coated belts using endless-belt-shaped base members having a cross-section with a large diameter include those that are used as transfer belts having a plurality of rollers disposed therein. Endless-belt-shaped base members may be those formed of metal thin films or synthetic resin films described above.

The thickness, diameter, and length of the base member may be adequately selected according to the usage of the fluororesin-coated roller or belt. For example, when the fluororesin-coated roller or belt is used as a fixing member of an image-forming apparatus, the length of the base member is determined on the basis of the width of a recording medium such as transfer paper. The diameter of the base member may be adequately determined according to the usage of the fluororesin-coated roller or belt or the type of the image-forming apparatus. When the fluororesin-coated roller or belt is used as a fixing member, the diameter is frequently selected from the range of usually 10 to 150 mm, preferably 13 to 100 mm, and more preferably 15 to 40 mm. The thickness of the base member for use in a fixing belt is typically selected from a range of 20 to 100 µm and preferably 25 to 80 µm. The shape of the base member may be a shape that has the same diameter throughout in a length direction, a crown shape, an inverted crown shape, or a tapered shape.

When the tubular base member or endless-belt-shaped base member is a shaped article formed of a heat resistant resin such as thermosetting polyimide, an inorganic filler may be contained to increase the heat conductivity. Examples of the inorganic filler include silica, alumina, silicon carbide, boron carbide, titanium carbide, tungsten carbide, silicon nitride, boron nitride, aluminum nitride, mica, potassium titanate, barium titanate, calcium carbonate, magnesium oxide, zirconium oxide, and talc. Of these, alumina, silicon carbide, boron carbide, and boron nitride are preferred since they have high heat conductivity.

When an inorganic filler is to be contained in a synthetic resin constituting the base member, the ratio thereof used is typically 50% by volume or less and frequently 40% by volume or less. The lower limit value is in many cases 5% by volume. In order to fabricate a thermosetting polyimide tube or endless belt containing an inorganic filler, a method can be employed in which a coating film is formed on an outer or inner peripheral surface of a columnar or cylindrical die by using a polyimide precursor varnish containing a dispersed inorganic filler and heating the coating film to conduct imidization.

A rubber layer is formed on a base member. The material for the rubber used in forming the rubber layer is preferably heat resistant rubber. Heat resistant rubber refers to rubber that has heat resistance sufficient to withstand continuous usage at a fixing temperature when a fluororesin-coated roller or belt including a rubber layer is installed in a fixing unit. Silicone rubber or fluororubber are preferred as the heat resistant rubber. These heat resistant rubbers may be used alone or in combination. The rubber layer may be a single layer such as a silicone rubber layer or a fluororubber layer or a composite layer formed by stacking a silicone rubber layer and a fluororubber layer, for example.

The heat resistant rubber is preferably millable or liquid silicone rubber, fluororubber, or a mixture thereof since the heat resistance is high. Specific examples of heat resistant rubber include silicone rubber such as dimethyl silicone rubber, fluorosilicone rubber, methyl phenyl silicone rubber, and vinyl silicone rubber; and fluororubber such as vinylidene fluoride rubber, tetrafluoroethylene-propylene copolymer rubber, tetrafluoroethylene-perfluoromethyl vinyl ether copolymer rubber, phosphazene fluororubber, and fluoropolyether. These heat-resistant rubbers can be used alone or in combination. A silicone rubber and a fluororubber may be blended and used.

A liquid silicone rubber and fluororubber easily forms rubber layers having high heat conductivity when highly filled with a thermoconductive filler. Examples of the liquid silicone rubber include condensation-type liquid silicone rubber and addition-type liquid silicone rubber. Among these, addition-type liquid silicone rubber is preferred.

Addition-type liquid silicone rubber makes use of a mechanism of crosslinking siloxane chains by addition reaction between a polysiloxane having vinyl groups and a polysiloxane having Si—H bonds in the presence of a platinum catalyst. The curing rate can be freely changed by changing the type and amount of the platinum catalyst or by using a reaction inhibitor (retarder). Addition-type liquid silicone rubber of a two-component type having a high curing rate at room temperature is a room-temperature curing type. Addition-type silicone rubber of a two-component type being made to cure at a temperature of 100° C. to 200° C. by adjusting the amount of the platinum catalyst or using a reaction inhibitor is a heat-curing type. Addition-type silicone rubber of a one-component type that has an intensified suppressing effect and maintains the liquid state as long as stored at a low temperature but turns rubbery upon heating during usage is a one-component heating type. Among these addition-type liquid silicone rubbers, heat-curing-type addition-type liquid silicone rubber is preferred from the viewpoints of interlayer adhesiveness and ease of operation of mixing a thermoconductive filler and forming a rubber layer.

The heat conductivity of the rubber layer can be increased by adding a thermoconductive filler. In the case where a fluororesin-coated roller or belt is used as a fixing member to be placed in a fixing unit, the heat conductivity of the rubber layer is preferably 0.2 to 4.0 W/(m·K), more preferably 0.6 to 3.0 W/(m·K), and most preferably 1.0 to 2.5 W/(m·K). In the case where a rubber layer having a particularly high heat conductivity is required, the heat conductivity of the rubber layer is preferably 1.1 W/(m·K) or more and more preferably 1.2 W/(m·K) or more.

The heat conductivity of the rubber layer is preferably increased by employing a method for forming a rubber layer by using a rubber composition containing a thermoconductive filler and at least one heat resistant rubber selected from the group consisting of a silicone rubber and a fluororubber. If the heat conductivity of the rubber layer is excessively low and the fluororesin-coated roller or belt is used as a fixing member, the heating efficiency is decreased and it is difficult to sufficiently improve the fixing property in high-speed printing or full-color printing. In contrast, if the heat conductivity of the rubber layer is excessively high, the blend ratio of the thermoconductive filler becomes excessively high and the mechanical strength and elasticity of the rubber layer may be degraded.

Preferable examples of the thermoconductive filler include inorganic fillers such as silicon carbide, boron nitride, alumina, aluminum nitride, potassium titanate, mica, silica, titanium oxide, talc, and calcium carbonate. The thermoconductive fillers can be used alone or in combination. Among these, silicon carbide, boron nitride, alumina, and aluminum nitride are particularly preferable.

The average particle diameter of the thermoconductive filler is usually 0.5 to 15 μm and preferably 1 to 10 μm. The average particle diameter can be measured by using "Shimadzu SALD-3000 Laser Diffraction Particle Size Analyzer" produced by Shimadzu Corporation. If the average particle diameter of the thermoconductive filler is excessively small, the effect of improving the heat conductivity is likely to be insufficient. If the average particle diameter of the thermoconductive filler is excessively large, irregularities will be generated in the surface of the rubber layer and the flatness and smoothness of the surface of the fluororesin layer on the rubber layer may be degraded.

The blend ratio of the thermoconductive filler in the rubber composition is usually 5 to 60% by volume, preferably 10 to 50% by volume, and most preferably 15 to 45% by volume on a basis of the total volume of the composition. If the amount of the thermoconductive filler is excessively small, it becomes difficult to sufficiently increase the heat conductivity of the rubber layer. If the amount of the thermoconductive filler is excessively large, the mechanical strength and elasticity of the rubber layer tends to be low.

The thickness of the rubber layer can be adequately determined according to the usage and shape of the fluororesin-coated roller or belt but is usually 10 μm or more and 5 mm or less and preferably 50 μm or more and 3 mm or less. When the fluororesin-coated roller or belt is a belt member including a metal tube or heat resistant resin tube as a base member, the thickness of the rubber layer is preferably 10 μm or more and 1 mm or less, more preferably 50 to 900 μm, and most preferably 100 to 800 μm considering the elasticity of the base member itself. In many cases, satisfactory results are obtained at a thickness of 200 to 350 μm. In the case where the fluororesin-coated roller or belt is a roller part including a columnar or cylindrical shaped article as the base member, the thickness of the rubber layer is preferably 50 μm or more and 5 mm or less and more preferably 500 μm or more and 3 mm or less since the base member is hard.

In the case where the fluororesin-coated roller or belt is used as a fixing member, the hardness of the rubber layer is preferably low to impart elasticity. The hardness of the rubber material used in the rubber layer can be measured by A-type Spring Hardness Test prescribed in Japanese Industrial Standards (JIS) K 6301. The rubber hardness measured by this method (referred to as "JIS-A hardness") is preferably less than 100, more preferably 15 to 90, yet more preferably 15 to 70, and most preferably 15 to 60. The compression set of the rubber material at 180° C./22 hours under 25% compression is preferably 30% or less and more preferably 20% or less. When the compression set is excessively high, the resilience of the rubber layer is degraded and the durability tends to be low.

When the thickness of the rubber layer is excessively small or the hardness excessively large, the fixing roller or belt can no longer fuse the unfixed toner image while deforming around the unfixed toner image and the fixing property is degraded. In particular, when a color toner is used, fixing failures tend to occur. When the thickness of the rubber layer is excessively large or hardness excessively low, the heat conductivity and durability tend to be degraded.

Figure 3:
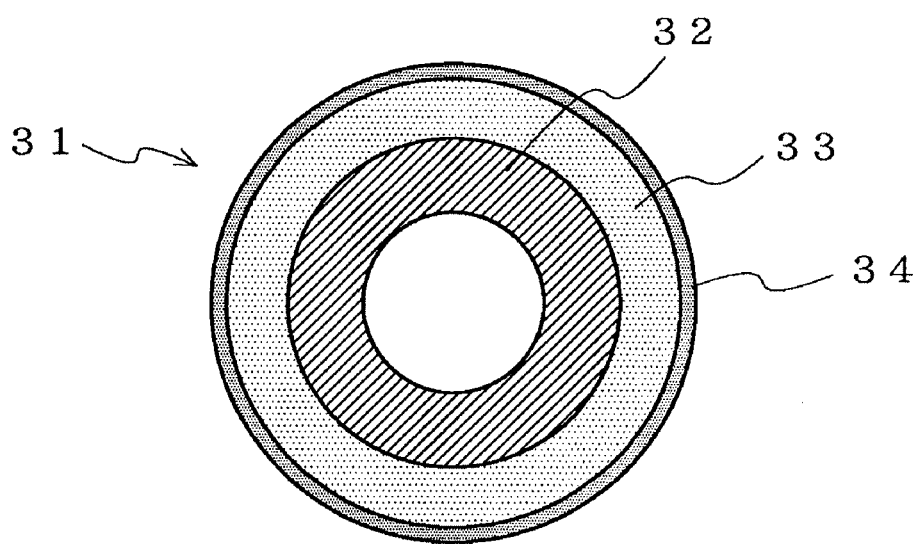
FIG. 3 is a cross-sectional view of a fluororesin-coated roller or a belt.

Referring now to a cross-sectional view of FIG. 3, a representative example of a fluororesin-coated roller or belt 31 according to the present invention has a layered structure that includes a base member 32, a rubber layer 33 on the base member 32, and a fluororesin layer 34 formed of a thermally shrinkable fluororesin tube as the outermost layer. In order to enhance the adhesiveness between the base member 32 and the rubber layer 33, a primer layer or an adhesive layer may be formed on an outer peripheral surface of the base member 32. In order to enhance the adhesiveness between the rubber layer 33 and the fluororesin layer 34, a primer layer or an adhesive layer may be provided between these layers.

Because the fluororesin layer is provided as the outermost layer, toner releasability, heat resistance, and wear resistance can be improved. When the fluororesin-coated roller or belt is used a as fixing member, there is no need to apply releasing oil such as silicone oil or sufficient toner releasability can be achieved even with application of small amounts of releasing oil because the fluororesin layer is arranged to be the outermost layer.

The thermally shrinkable fluororesin tube used in the present invention can usually be formed by extrusion molding and stretch molding. Examples of the material for the thermally shrinkable fluororesin tube include tetrafluoroethylene/perfluoroalkyl vinyl ether copolymer (PFA), tetrafluoroethylene/hexafluoropropylene copolymer (FEP), polytetrafluoroethylene (PTFE), ethylene/tetrafluoroethylene copolymer (ETFE), polychlorotrifluoroethylene (PCTFE), ethylene/chlorotrifluoroethylene copolymer (ECTFE), and polyvinylidene fluoride (PVDF). Among these fluororesins, tetrafluoroethylene/perfluoroalkyl vinyl ether copolymer (PFA) is preferred for its extrusion molding property, stretch molding property, heat resistance, and toner releasability. That is, in the present invention, a thermally shrinkable PFA tube is preferably used as the thermally shrinkable fluororesin tube.

The thermally shrinkable fluororesin tube is prepared by a method including melt-extruding a fluororesin into a tube through an annular die at a temperature in a range of 360° C. to 440° C. and uniaxially or biaxially stretching the tube. The average thickness of the thermally shrinkable fluororesin tube is usually in a range of 10 to 100 µm and preferably in a range of 12 to 70 µm. When the thermally shrinkable fluororesin tube is excessively thin, extrusion moldability during production is deteriorated and the durability and toner releasability tend to be insufficient. When the thermally shrinkable fluororesin tube is excessively thick and the fluororesin-coated roller or belt is used as a fixing member, the heat conductivity is insufficient and the fixing property tends to be low in high-speed printing or full-color printing.

The thermally shrinkable fluororesin tube preferably shows a thermal shrinkage ratio of 2% or more and preferably 3% or more in an axial direction and 3% to 15% and preferably 5% to 13% in a circumferential direction (radial direction) when measured in a dry heat atmosphere at 290° C. retained for 4 minutes. However, according to the production method of the present invention, the thermal shrinkage ratio of the thermally shrinkable fluororesin tube is not limited to the above-described ranges since the thermally shrinkable fluororesin tube can be tightly fusion-bonded onto the outer peripheral surface of the base member or rubber layer. The thermal shrinkability of the thermally shrinkable fluororesin tube differs depending on the type of the fluororesin.

The thermally shrinkable fluororesin tube used in the present invention must have an inner diameter larger than the outer diameter of the base member or the rubber layer since the tube is to cover the base member or the rubber-coated base member including a base member and a rubber layer on the outer peripheral surface of the base member. The inner diameter of the thermally shrinkable fluororesin tube may be freely selected on the basis of the outer diameter of the base member or rubber layer and the thermal shrinkage ratio of the thermally shrinkable fluororesin tube in the circumferential direction. The inner peripheral surface of the thermally shrinkable fluororesin tube can be surface-treated by a known method such as a plasma treatment or a chemical etching treatment.

The production method of the present invention is a method for producing a fluororesin-coated roller or belt that includes a base member having an outer peripheral surface whose cross-section taken in perpendicular to a central axis extending in the longitudinal direction is circular, and a fluororesin layer disposed directly on the base member or on a rubber layer on the base member. In particular, the production method includes following two steps.

(1) a step of inserting a base member or a rubber-coated base member prepared by forming at least a rubber layer on an outer peripheral surface of the base member into an empty space of a thermally shrinkable fluororesin tube having an inner diameter larger than an outer diameter of the base member or the rubber-coated base member; and (2) a pressure fusion-bonding step of bringing the base member or rubber-coated base member into contact with a hot plate surface heated to a temperature in a range of 250° C. to 400° C. under pressure while rotating the base member or rubber-coated base member so as to fusion-bond the thermally shrinkable fluororesin tube onto the outer peripheral surface of the base member or rubber-coated base member.

The outer diameter of the rubber-coated base member refers to the outer diameter of the outermost layer. A preferred embodiment of the present invention is a production method that includes following steps 1 to 3.

(I) a step of inserting a base member or a rubber-coated base member prepared by forming at least a rubber layer on an outer peripheral surface of the base member into an empty space of a thermally shrinkable fluororesin tube having an inner diameter larger than an outer diameter of the base member or the rubber-coated base member;

(II) step 2 of thermally shrinking the thermally shrinkable fluororesin tube with the base member or rubber-coated base member inserted to its empty space by controlling the temperature to 80° C. or more but less than the melting point of a fluororesin constituting the thermally shrinkable fluororesin tube so as to bring the thermally shrinkable fluororesin tube into close contact with the outer peripheral surface of the base member or rubber-coated base member; and (III) pressure fusion-bonding step 3 of bringing the base member or rubber-coated base member with the thermally shrinkable fluororesin tube in close contact with the outer peripheral surface thereof into contact with a hot plate surface heated to a temperature in a range of 250° C. to 400° C. under pressure while rotating the base member or rubber-coated base member so as to fusion-bond the thermally shrinkable fluororesin tube onto the outer peripheral surface of the base member or the rubber-coated base member.

In the step 1 of inserting the base member into the empty space of the thermally shrinkable fluororesin tube, a primer layer or an adhesive layer is preferably provided on the outer peripheral surface of the base member or rubber-coated base member. The step 2 is a step of preliminarily heat-shrinking the thermally shrinkable fluororesin tube so as to bring the thermally shrinkable fluororesin tube into close contact with the outer peripheral surface of the base member or rubber-coated base member. In the step 2, it is sufficient to bring the thermally shrinkable fluororesin tube into close contact (also referred to as "shrink-fixing") with the base member or rubber-coated base member in order to facilitate the treatment in the subsequent pressure fusion-bonding step 3 and there is no need to conduct a long heating treatment at a high temperature that causes fusion bonding. Accordingly, the step 2 may also be referred to as a "preliminary shrinking step".

In the preliminary shrinking step 2, the thermally shrinkable fluororesin tube with the base member or rubber-coated base member inserted into the empty space thereof is preferably heat-shrunk by bringing the thermally shrinkable fluororesin tube into contact with dry heat atmosphere having a temperature controlled to 80° C. or more but less than the melting point of the fluororesin constituting the thermally shrinkable fluororesin tube. This step 2 is usually conducted in a dry heat atmosphere in a furnace controlled to a temperature of 80° C. or more but less than the melting point of the fluororesin. Alternatively, other methods may be conducted such as jet-spraying heated air through a hot spray gun. Heated air is a type of dry heat atmosphere.

The temperature of the dry heat atmosphere in the preliminary shrinking step 2 depends on the type of the fluororesin forming the thermally shrinkable fluororesin tube. However, in the case where a thermally shrinkable PFA tube is used, the temperature is usually in a range of 90° C. to 290° C., preferably 130° C. to 290° C., more preferably 150° C. to 290° C., and most preferably 180° C. to 290° C. The treatment time in the step 2 is the time sufficient for the thermally shrinkable fluororesin tube to thermally shrink and closely contacts the outer peripheral surface of the base member or the rubber-coated base member. The length of time differs depending on the temperature of the dry heat atmosphere and the thermal shrinkability of the thermally shrinkable fluororesin tube but is usually within 1 to 40 minutes, preferably 1 to 30 minutes, more preferably 1 to 20 minutes, and most preferably 1 to 15 minutes.

In the pressure fusion-bonding step 3, the base member or rubber-coated base member with the thermally shrinkable fluororesin tube in close contact with the outer peripheral surface thereof is brought into contact with a hot plate surface heated to a temperature in a range of 250° C. to 400° C. under pressure while rotating the base member or rubber-coated base member so that the thermally shrinkable fluororesin tube is fusion-bonded onto the outer peripheral surface of the base member or rubber-coated base member.

Previously, fusion bonding of the thermally shrinkable fluororesin tube has been performed batchwise in which heating is conducted for a long time in a heating furnace in a dry heat atmosphere at high temperature. However, according to this conventional method, it has taken a long time to sufficiently shrink the thermally shrinkable fluororesin tube and then a long time to fusion-bond the thermally shrinkable fluororesin tube at high temperature. For example, in the case where a thermally shrinkable PFA tube has been used, thermal shrinking and fusion-bonding have been performed while changing the temperature in the furnace stepwise from 220° C. to about 300° C. When the time for subsequent cooling is added, a total of about 150 minutes of treatment time has been needed. According to this conventional method, a fluororesin layer having good surface flatness and smoothness is obtained and fusion bonding of the fluororesin layer to the base member or the rubber layer can be sufficiently conducted. On the other hand, according to the conventional method, a treatment at high temperature needs to be conducted for a long time, which poses problems of productivity and thermal deterioration of the rubber layer in the fusion bonding step in case where a rubber layer is present.

In this invention, the fusion-bonding step is not performed in a dry heat atmosphere but through the contact with the hot plate surface under pressure. According to this fusion-bonding technique involving contact under pressure, the heat of the hot plate is directly transmitted to the thermally shrinkable fluororesin tube and the thermally shrinkable fluororesin tube is strongly pressured against the outer peripheral surface of the base member or rubber-coated base member. Thus, fusion-bonding can be completed in a short time. According to the method of the present invention, the fusion-bonding step can be carried out in a significantly short time and thermal deterioration of the rubber layer can be significantly suppressed.

Since the surface of the thermally shrinkable fluororesin tube has good non-tackiness and heat resistance, the surface does not fusion-bond onto the hot plate surface even when the surface is brought into contact with the hot plate surface at high temperature under pressure after the preliminary shrinking in step 2. This property of the thermally shrinkable fluororesin tube realizes the production method that includes the step 3 according to the present invention.

A hot plate is a plate having a flat surface which can be heated with a heater. The heater may be installed underneath the hot plate or inside the hot plate. The material of the hot plate is, for example, a metal or a metal alloy such as stainless steel and preferably has a strength and/or thickness that withstands the pressing force in the pressure fusion-bonding step. The hot plate may be formed of other materials such as a ceramic. Alternatively, a metal or metal alloy plate coated with a sheet or coating film of a heat resistant resin such as a polyimide or fluororesin or a heat resistant rubber such as silicone rubber or fluororubber may be used.

The surface of the hot plate is preferably flat and free of scratches or irregularities. Defects such as scratches in the surface of the hot plate will be transferred to the surface of the fluororesin layer of the fluororesin-coated roller or belt in the pressure fusion-bonding step. However, when the base member has a crown shape, an inverted crown shape, or a tapered shape, the surface of the hot plate may also be changed to match the shape of the base member.

The arithmetic mean surface roughness Ra of the hot plate measured according to Japanese Industrial Standards (BS) B 0601 is preferably 5 µm or less, more preferably 3 µm or less, and most preferably 2 µm or less. When the surface roughness of the hot plate surface is excessively large, the flatness of the surface of the fluororesin layer is impaired and the quality of an image is deteriorated when the fluororesin-coated roller or belt is used as a fixing member.

The surface temperature of the hot plate is in a range of 250° C. to 400° C., preferably 260° C. to 320° C., and more preferably 270° C. to 310° C. The preferred temperature range of the hot plate surface differs depending on the type of the fluororesin constituting the thermally shrinkable fluororesin tube and thus is not limited to the aforementioned ranges.

In the step 2, the fluororesin layer in close contact with the outer peripheral surface of the base member or rubber layer sometimes contains bubbles entrapping air and slack and wrinkles caused by thermal shrinking of the thermally shrinkable fluororesin tube. In the step 3 of the present invention, the base member or rubber-coated base member having the thermally shrinkable fluororesin tube in close contact with the outer peripheral surface thereof is brought into contact with the hot plate surface under pressure while rotating the base member or rubber-coated base member so as to fusion-bond the thermally shrinkable fluororesin tube. Thus, defects such as bubbles, slack, and wrinkles are eliminated. According to the production method of the present invention, air trapping does not occur. According to the production method of the present invention in which the thermally shrinkable fluororesin tube is brought into contact under pressure for heating, the thermal shrinkage rate of the thermally shrinkable fluororesin tube does not affect the process. Even when thermal shrinking of the thermally shrinkable fluororesin tube in the step 2 has been insufficient, the thermal shrinking can be completed in the step 3.

In order to rotate the base member or rubber-coated base member having the thermally shrinkable fluororesin tube in close contact with the outer peripheral surface thereof while bringing the base member or rubber coated base member in contact with the hot plate surface under pressure when the base member is columnar or cylindrical in shape and has bearing portions at the respective ends, a method of rotating the member while applying pressure to the bearing portion at the both ends can be employed.

When the base member is a hollow base member having a cylindrical, tubular, or endless-belt shape, has no bearing portions, and has flexibility, a roller-shaped pressing member is preferably used as an auxiliary part. The roller-shaped pressing member is a roller-shaped article having an outer diameter smaller than the inner diameter of the hollow base member. The roller-shaped pressing member preferably has a circular cross-section and is preferably smoothly rotatable.

When a roller-shaped pressing member is used, the pressure fusion-bonding step (step 3) proceeds as follows:

a) A roller-shaped pressing member having an outer diameter smaller than the inner diameter of a hollow base member is inserted into an empty space of the hollow base member, b) While applying pressing force from above onto two axial portions of the roller-shaped pressing member protruding from the two ends of the hollow base member, the roller-shaped pressing member is moved along the hot plate surface so as to bring the base member or rubber-coated base member having the thermally shrinkable fluororesin tube in close contact with the outer peripheral surface thereof into contact with a hot plate surface heated to a temperature in a range of 250° C. to 400° C. under pressure while rotating the base member or rubber-coated base member, during which the thermally shrinkable fluororesin tube is heated under pressure in a nip portion between the roller-shaped pressing member and the hot plate so as to fusion-bond the thermally shrinkable fluororesin tube to the outer peripheral surface of the base member or rubber-coated base member.

Figure 2:
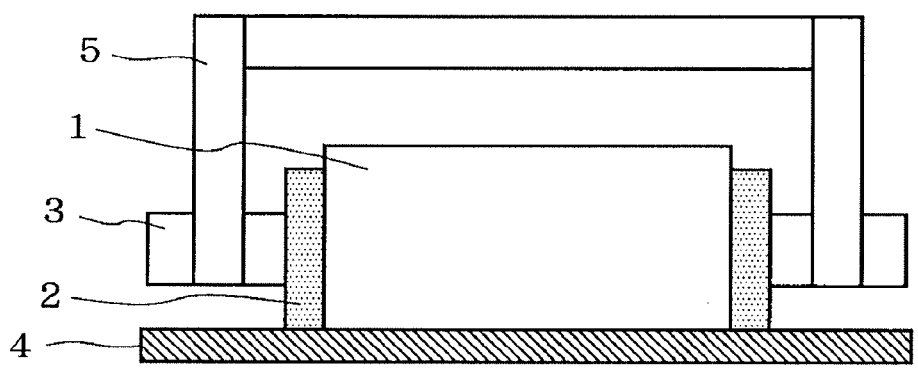
FIG. 2 is a side view of the example of the production step illustrated in FIG. 1.

FIG. 1 is a schematic cross-sectional view illustrating an example of a production step in which a base member or rubber-coated base member having a thermally shrinkable fluororesin tube in close contact with the outer peripheral surface thereof is brought into contact with a hot plate surface under pressure while rotating the base member or rubber-coated base member. FIG. 2 is a side view of the same step.

A roller-shaped pressing member 2 is inserted into a hollow base member constituting a base member or rubber-coated base member 1 having an outer peripheral surface in close contact with a thermally shrinkable fluororesin tube. The resulting unit is placed on a surface of a hot plate 4. While pressing force from above is applied to two axial portions 3 (two end portions of a shaft) of the roller-shaped pressing member 2 protruding from the two end portions of the hollow base member, the roller-shaped pressing member is moved along the hot plate surface. The movement of the roller-shaped pressing member 2 may be a movement of sliding in parallel to the hot plate surface or may be a movement achieved by rotation of the roller-shaped pressing member. In this manner, the base member or rubber-coated base member in close contact with the thermally shrinkable fluororesin tube can be brought into contact to the heated hot plate surface under pressure while rotating the base member or rubber-coated base member.

Pressing and moving of the two axial portions 3 of the roller-shaped pressing member are carried out by using a transport unit 5. This transport unit 5 may be a unit equipped with a mechanism that can apply pressing force to the two axial portions 3 of the roller-shaped pressing member and that can move the roller-shaped pressing member along the surface of the hot plate 4. The load needed for applying the pressing force is usually in a range of 10 to 50 kg and preferably 15 to 30 kg. However, since this load changes with the size of the fluororesin-coated roller or belt and the type of the fluororesin layer, the load is not limited to these ranges. If the pressing force is excessively weak, it is difficult to conduct sufficient fusion-bonding or it takes longer to perform fusion-bonding. If the pressing force is excessively large, failures such as breaking of the base member are likely to occur.

The thermally shrinkable fluororesin tube is heated under pressure in a nip portion 6 between the roller-shaped pressing member 2 and the hot plate 4 surface to fusion-bond the thermally shrinkable fluororesin tube onto the outer peripheral surface of the base member or the rubber layer. Fusion-bonding at the nip portion 6 can be completed in about 10 to 30 seconds when the width of the nip portion 6 is 2 to 10 mm. The fusion-bonding at this nip portion 6 is carried out over the entire peripheral surface so that a fluororesin layer having good surface flatness and smoothness can be tightly fusion-bonded onto the outer peripheral surface of the base member or the rubber layer without occurrence of bubbles, slack, or wrinkles. In order to efficiently carry out fusion-bonding at the nip portion 6, the roller-shaped pressing member 2 is preferably moved by pitch feeding or continuously along the surface of the hot plate 4. Pitch feeding is preferably carried out at 10 to 30 second intervals but is not particularly limited. An adequate pitch feed interval can be selected depending on the size of the fluororesin-coated roller or belt or the type of the fluororesin layer.

The total treatment time in the pressure fusion-bonding step (step 3) is preferably 30 minutes or less, more preferably 25 minutes or less, and most preferably 20 minutes or less. In many cases, satisfactory results can be obtained even when the total treatment time is 15 minutes or less. The lower limit for the total treatment time is about 10 minutes. The treatment time in the step 3 differs depending on conditions such as the size of the fluororesin-coated roller or belt and the heat treatment temperature.

The pressure fusion-bonding step is preferably followed by a reheating step of heating the fluororesin layer formed by the thermally shrinkable fluororesin tube fusion-bonded to the outer peripheral surface of the base member or rubber-coated base member (hereinafter this layer may be simply referred to as "fluororesin layer") to a temperature equal to or higher than the melting point of the fluororesin constituting the fluororesin layer. When reheating is conducted, the fluororesin layer softens or becomes partially molten and the inner stresses remaining in the fluororesin layer formed by the pressure fusion-bonding step are released thereby. As a result, the bonding strength is maintained even when the fluororesin-coated roller or belt is used for a long time and separation between the fluororesin layer, i.e., a surface layer, and the base member or rubber-coated base member and generation of bubbles can be suppressed.

The heating method used in the reheating step is not particularly limited as long as the surface temperature of the fluororesin layer can be increased to the melting point or higher. In the reheating step, a reheating member equipped with a plurality of xenon flash lamps that can emit flashing light can be used; however, usually, a roller or belt coated with a fluororesin formed in the pressure fusion-bonding step is placed in an oven set to a temperature equal to or higher than the melting point of the fluororesin constituting the fluororesin layer. When the roller-shaped pressing member has been used in the pressure fusion-bonding step, the roller-shaped pressing member is usually removed before the reheating step. However, the reheating step may be performed without removing the roller-shaped pressing member in order to prevent deformation of the roller or belt. The temperature at which the reheating step is conducted may be selected so that the surface temperature of the fluororesin layer is typically in a range of the melting point of the fluororesin to 35° C. higher than the melting point of the fluororesin, preferably more than the melting point of the fluororesin but not more than 25° C. higher than the melting point of the fluororesin, more preferably more than the melting point of the fluororesin but not more than 15° C. higher than the melting point of the fluororesin, and most preferably more than the melting point of the fluororesin but not more than 10° C. higher than the melting point of the fluororesin. When the reheating step is conducted in a temperature environment in which the surface temperature of the fluororesin layer is 40° C. or more higher than the melting point of the fluororesin, the fluororesin layer may melt and flow although this depends on the length of time that the resin is placed in the environment. The length of time of conducting the reheating step depends on the temperature environment but usually about 1 second to 30 minutes, preferably about 1 second to 20 minutes, more preferably about 1 second to 15 minutes, and most preferably about 1 second to 10 minutes in order to induce the fluororesin layer to soften or enter into a partially molten state and to prevent melting and flowing of the fluororesin layer.

The roller or belt coated with the fluororesin layer that underwent the reheating step may be discharged from the oven and cooled as is to a temperature of 20° C. to 40° C. or room temperature. Alternatively, after the reheating step, a rapid cooling step of cooling the fluororesin layer to a temperature of 20° C. to 40° C. or room temperature at a rate of 200° C./min or more, preferably 220° C./min or more, and most preferably 240° C./min or more may be performed so as to maintain the state of the surface and interior of the fluororesin layer from which the inner stresses are released. As a result, the flatness and smoothness of the surface of the fluororesin layer can be enhanced further. Moreover, in the reheating step, the inner stresses in the fluororesin layer are released, the homogeneity of the fluororesin layer is improved, and the inner stresses in the rubber layer inside are also released. Accordingly, the hardness of the fluororesin-coated roller or belt is lowered.

The method for carrying out the rapid cooling step is not particularly limited as long as the surface temperature of the fluororesin layer can be decreased at a rate of 200° C./min or higher. It is sufficient if the fluororesin layer can be exposed to a low temperature atmosphere. For example, the fluororesin layer may be placed in a refrigerator or a freezer, immersed in a low-temperature solvent, or blown by cold air. An example of a particularly preferred method is to blow cold air of 1° C. to 25° C., preferably 3° C. to 20° C., and more preferably 5° C. to 15° C. on the fluororesin layer for 15 to 100 seconds, preferably 20 to 90 seconds, and most preferably 30 to 80 seconds.

If the cooling rate is less than 200° C./min, deterioration of the rubber layer is likely to proceed, thereby possibly increasing the hardness and decreasing the strength. If rapid cooling at a cooling rate exceeding 800° C./min is performed, cooling of the surface of the fluororesin layer may become partly nonuniform and cracks may occur. Accordingly, the rapid cooling step is preferably performed at a cooling rate of 800° C./min or less, preferably 700° C./min or less, and more preferably 600° C./min or less.

EXAMPLES

The present invention will now be described in more specific details through Examples and Comparative Examples. The measurement methods and evaluation methods of various physical properties and characteristics are as follows.
(1) Coating Property A tubular base member having a rubber layer was coated with a thermally shrinkable PFA tube. Thermal shrinking and fusion bonding were performed and the coating property was evaluated by the following standard. The number of measurement samples was 100 (n=100).

A: A coating layer free of bubbles, slack, and wrinkles and having a uniform thickness was formed and the number of samples in which fine bubbles, slack, wrinkles, or any combination of these defects were observed with naked eye was 3 or less.

B: A coating layer free of bubbles, slack, and wrinkles and having a uniform thickness was formed. However, the number of samples in which fine bubbles, slack, wrinkles, or any combination of these defects were observed with naked eye was 4 to 10.

C: The coating layer had poor appearance and bubbles, slack, wrinkles, or any combination of these defects were observed with naked eye in many samples.

(2) Hardness (Surface Hardness)

Hardness was measured using a micro rubber hardness meter (MD-1 produced KOBUNSHI KEIKI Co., Ltd.) according to A-type Spring Hardness Test set forth in Japanese Industrial Standards (JIS) K 6301.
(3) Fixing Property Each of the fluororesin-coated belts prepared in Examples and Comparative Examples was installed as a fixing belt in a fixing unit of a commercially available electrophotographic copier. An image was formed by using this fixing unit. The fixed image was rubbed and the fixing property was evaluated based on the following standard.

A: No portions were rubbed off from the image.
B: Small portions were rubbed off from the image but the extent thereof poses no practical problem.
C: Portions rubbed off from the image were identifiable.
(4) Durability After 100,000 Hours of Paper Feeding Each of the fluororesin-coated belts prepared in Examples and Comparative Examples was installed as a fixing belt in a fixing unit of a commercially available electrophotographic copier. Copy paper on which an unfixed image was formed by using four color toners (cyan, magenta, yellow, and black toners) was passed through the fixing unit and pressed at a nip width of 3 mm. After 100,000 sheets of copy paper were continuously subjected to fixing, the surface state of the fluororesin-coated belt was observed with naked eye and durability after 100,000 hours of paper feeding was evaluated on the basis of splits and cracks (those longer than splits).

Examples 1 and 2

A stainless steel tube having a thickness of 30 μm, a length of 279.5 mm, and an inner diameter of 24 mm was prepared.

An adhesive (X-33-173) produced by Shin-Etsu Chemical Co., Ltd., was applied to form a thin film on an outer peripheral surface of the stainless steel tube and dried to form an adhesive layer having a thickness of 3 μm. Silicone rubber (X-34-2008 produced by Shin-Etsu Chemical Co., Ltd.) was mixed with alumina powder to prepare a rubber composition having a heat conductivity of 1.1 W/m·K.

The rubber composition was applied onto the adhesive layer on the outer peripheral surface of the stainless steel tube by using a dispenser and heat-treated to form a rubber layer having a thickness of 275 μm. An adhesive (PR-990CL produced by Du Pont-Mitsui Fluorochemicals Co., Ltd.) containing PFA was applied onto the rubber layer to form an adhesive layer having a thickness of 3 μm. Thus, a rubber-coated base member was fabricated.

A thermally shrinkable PFA tube having an inner diameter of 25 mm (trade name: SMT, produced by GUNZE LIMITED) was prepared as a thermally shrinkable fluororesin tube. The rubber-coated base member was inserted into an empty space of the thermally shrinkable PFA tube (step 1). The thermally shrinkable PFA tube in such a state was thermally shrunk by being left in a dry heat atmosphere at 200° C. for 4 minutes to come into close contact with the outer peripheral surface of the rubber layer of the rubber-coated base member (step 2).

A roller-shaped pressing member (roller-shaped article having an outer diameter of 20 mm and made of stainless steel) was inserted into the empty space of the rubber-coated base member having the outer peripheral surface in close contact with the preliminarily shrunk thermally shrinkable PFA tube. The resultant unit was placed on a hot plate surface (arithmetic mean surface roughness Ra=2 μm or less) having a surface temperature controlled to 300° C. and moved by pitch feeding using a transport unit while applying a pressing load of 20 kg (10 kg on each side) to two axial portions of the roller-shaped pressing member so that the process time in a nip portion having a width of about 8 mm was 20 seconds (step 3).

Thus, a fluororesin-coated belt was fabricated. The total of the process time in the step 3 was 15 minutes. The length of the entire facility was about 1.5 m and a large number of fluororesin-coated belts (samples) could be fabricated simultaneously or sequentially. The results are shown in Table I along with the results of Example 2 in which the total process time in the step 3 was 20 minutes.

Example 3

The fluororesin-coated belt obtained in Example 1 was placed in an electric oven maintained at a temperature of 320° C. while holding the two axial portions of the roller-shaped pressing member and reheated by retaining thereat for 4 minutes.

The fluororesin-coated belt discharged from the electric oven was rapidly cooled while holding the two axial portions of the roller-shaped pressing member by blowing 10° C. cold air from a blower in the direction of the belt axis for 70 seconds. The cooled fluororesin-coated belt was immediately discharged. The surface temperature of the fixing belt was 25° C. (cooling rate: 253° C./min). After the rapid cooling, the roller-shaped pressing member was removed and measurement was conducted. The results are shown in Table I.

Example 4

A rubber-coated base member was fabricated as in Example 1. Next, instead of a thermally shrinkable PFA tube (trade name: SMT, produced by GUNZE LIMITED) having an inner diameter of 25 mm used in Example 1, a thermally shrinkable PFA tube (trade name: 950HP-PLUS produced by Du Pont-Mitsui Fluorochemicals Co., Ltd.) having an inner diameter of 25 mm was prepared as the thermally shrinkable fluororesin tube. The rubber-coated base member was inserted into an empty space of the thermally shrinkable PFA tube (step 1). The thermally shrinkable PFA tube was thermally shrunk by being left in a dry heat atmosphere at 150° C. for 30 minutes to come into close contact with the outer peripheral surface of the rubber layer of the rubber-coated base member (step 2).

A roller-shaped pressing member (roller-shaped article having an outer diameter of 20 mm and made of stainless steel) was inserted into the empty space of the rubber-coated base member having the outer peripheral surface in close contact with the preliminarily shrunk thermally shrinkable PFA tube. The resultant unit was placed on a hot plate surface (arithmetic mean surface roughness Ra=2 μm or less) having a surface temperature controlled to 300° C. and moved by pitch feeding using a transport unit while applying a pressing load of 20 kg (10 kg on each side) to two axial portions of the roller-shaped pressing member so that a nip portion having a width of about 8 mm was maintained at a peripheral velocity of 2 mm/sec (step 3).

The resulting fluororesin-coated belt was placed in an electric oven maintained at a temperature of 315° C. while holding the two axial portions of the roller-shaped pressing member and reheated by retaining thereat for 5 minutes.

The fluororesin-coated belt discharged from the electric oven was rapidly cooled while holding the two axial portions of the roller-shaped pressing member by blowing 10° C. cold air from a blower in the direction of the belt axis for 70 seconds. The cooled fluororesin-coated belt was immediately discharged. The surface temperature of the fixing belt was 25° C. (cooling rate: 249° C./min). After the rapid cooling, the roller-shaped pressing member was removed and measurement was conducted. The results are shown in Table I.

Comparative Example 1

A rubber-coated base member having an outer peripheral surface in close contact with a thermally shrinkable PFA tube was obtained by conducting the same treatment as the step 2 in Example I. The rubber-coated base member was placed in a heating furnace and heat-treated at 220° C. for 50 minutes and then at 300° C. for 80 minutes. The entire fluororesin-coated belt was slowly cooled over 20 minutes. The total heat treatment time was 150 minutes. The heat treatment at such high temperature in a dry heat atmosphere was conducted batchwise and a large number of samples could be fabricated simultaneously. The results are shown in Table I.

TABLE I

|  | Example 1 Without reheating | Example 2 Without reheating | Example 3 With reheating | Example 4 With reheating | Comparative Example 1 Conventional method |
|---|---|---|---|---|---|
| Coating property | A | A | A | A | B |
| Surface hardness | 75 | 76 | 76 | 76 | 85 |

TABLE I-continued

|  | Example 1 Without reheating | Example 2 Without reheating | Example 3 With reheating | Example 4 With reheating | Comparative Example 1 Conventional method |
|---|---|---|---|---|---|
| Fixing property | A | A | A | A | B |
| Durability after feeding 100,000 sheets | Slight splits | No splits | No splits | No splits | Slight cracks |
| Heat treatment time (min) | 15 | 20 | 15 | 15 | 150 |

As apparent from the results in Table I, according to the production method of the present invention, high-performance, high-quality fluororesin-coated belts can be obtained in a short time (Example 1). Durability after feeding 100,000 sheets is also achieved by adjusting the heat treatment time (Example 2). A fluororesin-coated belt that has inner stresses of the fluororesin layer sufficiently released and exhibits satisfactory durability after feeding 100,000 sheets can be easily obtained by conducting the reheating step without substantially increasing the surface hardness (Examples 3 and 4). In contrast, according to the conventional method of conducting a heat treatment in a high-temperature atmosphere for a long time, the rubber deteriorated due to the long heat treatment hours and the hardness was high (rubber was hard). In addition, since heat was absorbed by the core metal (stainless steel tube) and the rubber layer and there was a temperature distribution in the furnace, the fluororesin layer was not uniformly heated to a temperature equal to or higher than the melting point of the fluororesin. Thus, the inner stresses were not satisfactorily released, the defect ratio of bubbles, wrinkles, etc., was high, bending fatigue occurred as a result of long hours of paper feeding, and cracks occurred in the fluororesin layer (Comparative Example 1).

INDUSTRIAL APPLICABILITY

A fluororesin-coated roller or belt obtained by the production method of the present invention can be used in various parts of an electrophotographic image-forming apparatus. In particular, the fluororesin-coated roller or belt can be used as a fixing roller, a fixing belt, a pressure roller, a pressure belt, a charge roller, a charge belt, a transfer roller, a transfer belt, or various other parts.

The fluororesin-coated roller or belt obtained by the production method of the present invention can be used as not only various parts of am image-forming apparatus but also various parts in a wide variety of technical fields that require such surface properties as non-tackiness, heat-resistance, and wear resistance. The production method of the present invention can be used in a wide variety of technical fields.

REFERENCE SIGNS LIST 1 rubber-coated base member in close contact with a thermally shrinkable fluororesin tube
2 roller-shaped pressing member
3 two axial portions of a roller-shaped pressing member
4 hot plate
5 transport unit
6 nip portion
31 cross-sectional view of an example of a fluororesin-coated roller or belt
32 hollow base member
33 rubber layer
34 fluororesin layer

The invention claimed is:

1. A method for producing a fluororesin-coated roller or belt that includes a base member having an outer peripheral surface having a circular cross-section taken in perpendicular to a central axis extending in a longitudinal direction and a fluororesin layer disposed directly on the base member or on a rubber layer on the base member, the method comprising:
 (1) a step of inserting the base member or a rubber-coated base member prepared by forming at least a rubber layer on an outer peripheral surface of the base member into an empty space of a thermally shrinkable fluororesin tube having an inner diameter larger than an outer diameter of the base member or the rubber-coated base member;
 (2) a pressure fusion-bonding step of bringing the base member or rubber-coated base member into contact with a hot plate surface heated to a temperature in a range of 250° C. to 400° C. under pressure while rotating the base member or rubber-coated base member so as to fusion-bond the thermally shrinkable fluororesin tube onto the outer peripheral surface of the base member or the rubber-coated base member;
 (3) a reheating step of heating a fluororesin layer formed of the thermally shrinkable fluororesin tube fusion-bonded to the outer peripheral surface of the base member or rubber-coated base member to a temperature equal to or higher than a melting point of a fluororesin constituting the fluororesin layer; and
 (4) a rapid cooling step of cooling the fluororesin layer at a rate of 200 to 600° C./min.

2. The production method according to claim 1, further comprising a preliminary shrinking step of thermally shrinking the thermally shrinkable fluororesin tube having the base member or rubber-coated base member inserted into the empty space by controlling the temperature to 80° C. or more but not more than a melting point of the fluororesin constituting the thermally shrinkable fluororesin tube so as to bring the thermally shrinkable fluororesin tube in close contact with the outer peripheral surface of the base member or rubber-coated base member,
 wherein, in the pressure fusion-bonding step, the base member or rubber-coated base member having the outer peripheral surface in close contact with the thermally shrinkable fluororesin tube is brought into contact with the hot plate surface under pressure while rotating the base member or rubber-coated base member so that the thermally shrinkable fluororesin tube is fusion-bonded to the outer peripheral surface of the base member or rubber-coated base member.

3. The production method according to claim 1, wherein the base member is a hollow base member having a cylindrical shape, a tubular shape, or an endless-belt shape.

4. The production method according to claim 3, wherein in the pressure fusion-bonding step,
 a) a roller-shaped pressing member that has an outer diameter smaller than an inner diameter of the hollow base member is inserted into an empty space of the hollow base member; and b) the roller-shaped pressing member is moved along the hot plate surface while applying pressing force from above onto two axial portions of the roller-shaped pressing member protruding from two end portions of the hollow base member so as to bring the base member or rubber-coated base member into contact with the hot plate surface heated to a temperature in a range of 250° C. to 400° C. under pressure while rotating the base member or rubber-coated base member, during which the thermally shrinkable fluororesin tube is heated under pressure in a nip portion between the roller-shaped pressing member and the hot plate surface so that the thermally shrinkable fluororesin tube is fusion-bonded to the outer peripheral surface of the base member or rubber-coated base member.

5. The production method according to claim 4, wherein the roller-shaped pressing member is moved along the hot plate surface by pitch feeding or continuously.

6. The production method according to claim 1, wherein the thermally shrinkable fluororesin tube is a thermally shrinkable PFA tube composed of tetrafluoroethylene-perfluoroalkyl vinyl ether copolymer.

* * * * *